J. T. SIBLEY.
ELECTRIC MOTOR FOR TALKING MACHINES.
APPLICATION FILED JUNE 19, 1917.
1,381,138.
Patented June 14, 1921.
3 SHEETS—SHEET 1.
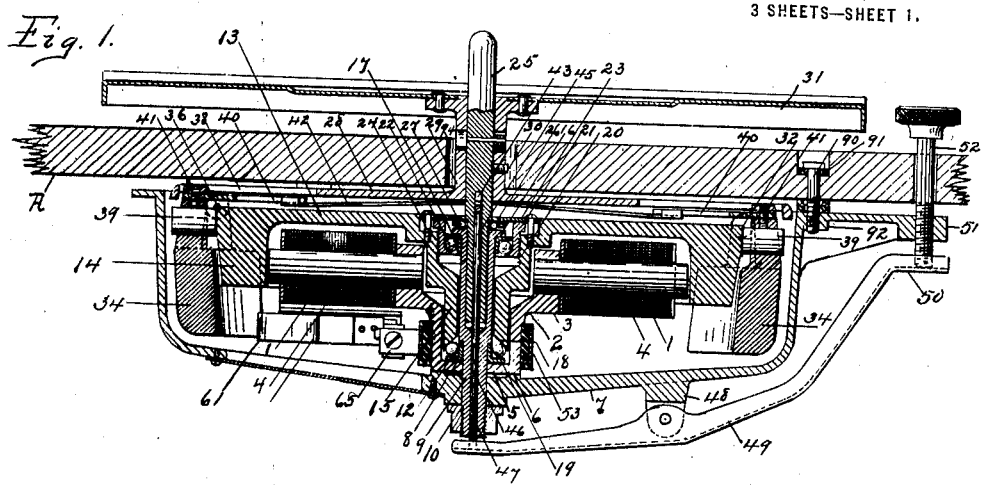
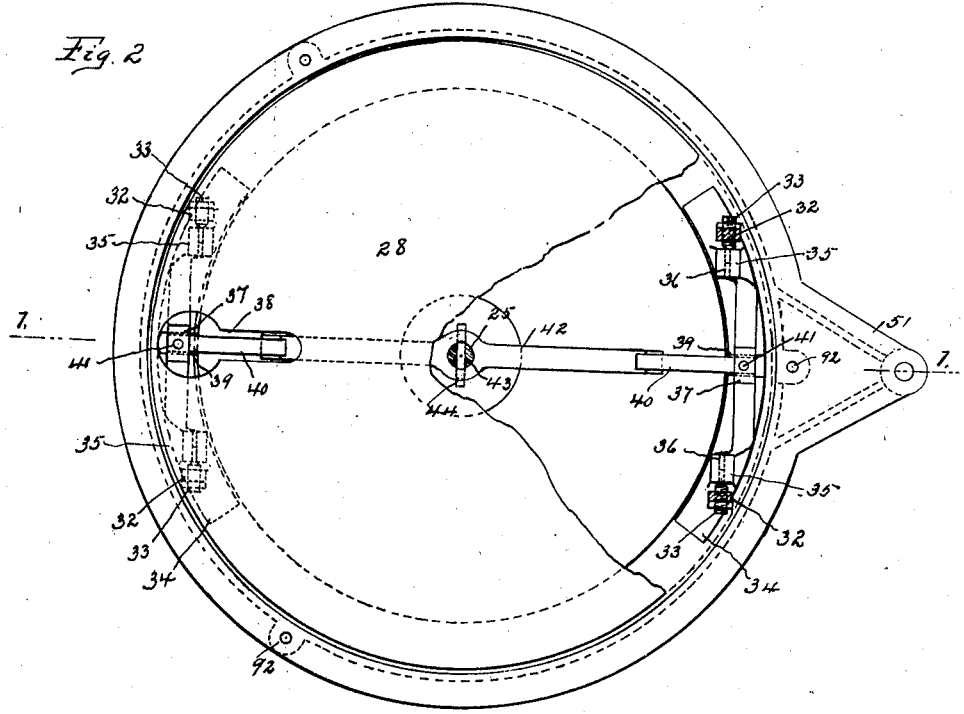
INVENTOR.
BY
ATTORNEY

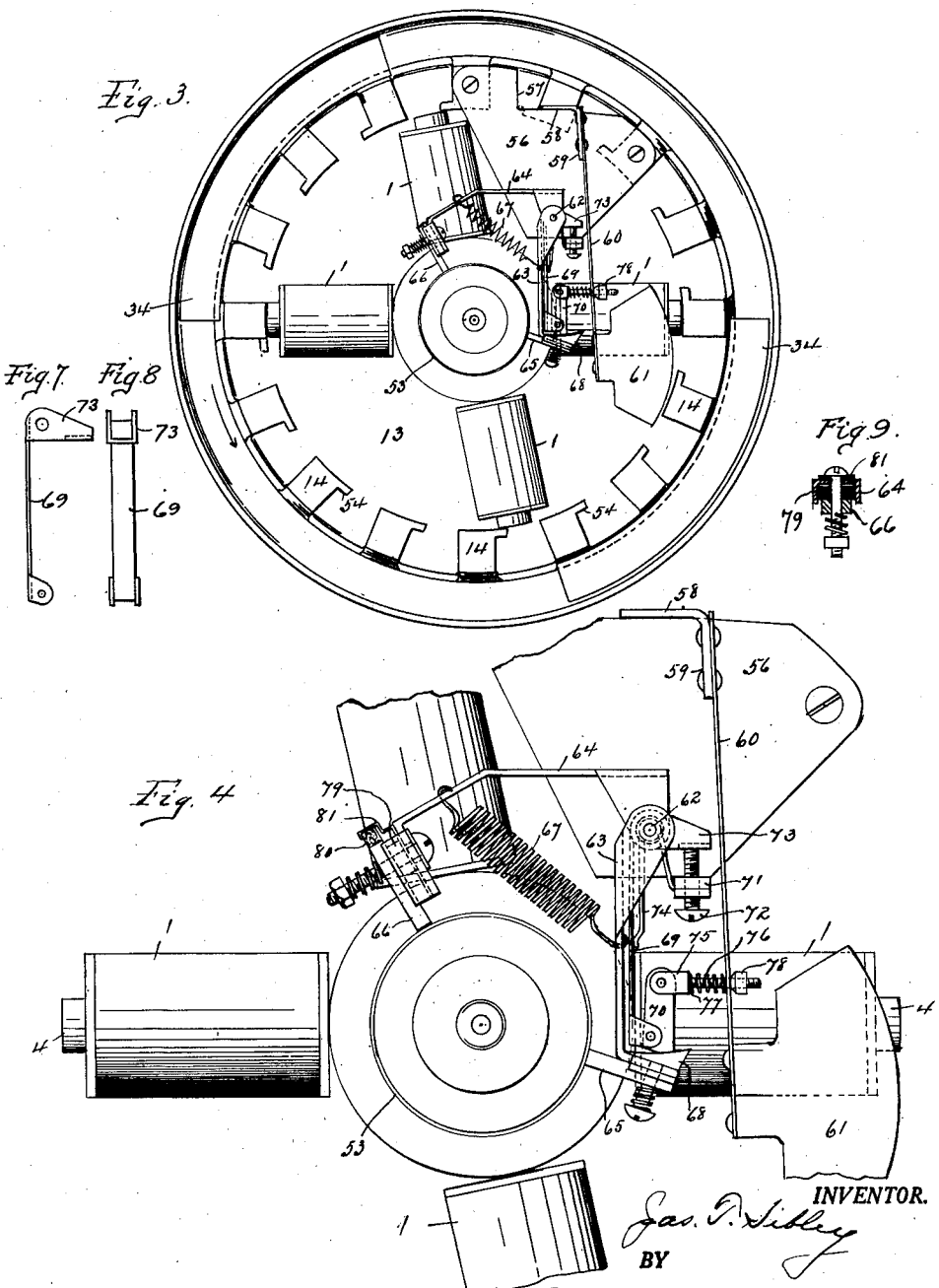

J. T. SIBLEY.
ELECTRIC MOTOR FOR TALKING MACHINES.
APPLICATION FILED JUNE 19, 1917.
1,381,138.
Patented June 14, 1921.
3 SHEETS—SHEET 3.
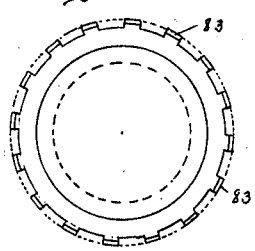
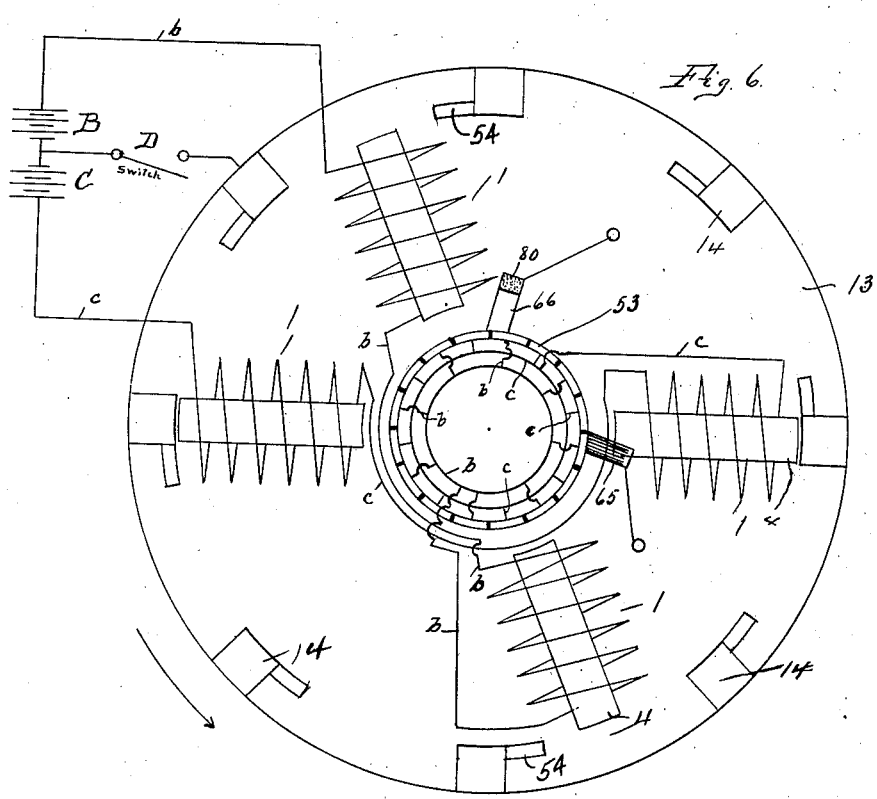

UNITED STATES PATENT OFFICE.

JAMES T. SIBLEY, OF NEWARK, NEW JERSEY.

ELECTRIC MOTOR FOR TALKING-MACHINES.

1,381,138.  Specification of Letters Patent.  Patented June 14, 1921.

Application filed June 19, 1917. Serial No. 175,565.

*To all whom it may concern:*

Be it known that I, JAMES T. SIBLEY, a citizen of the United States, residing in the city of Newark, county of Essex, and State of New Jersey, have invented certain new and useful Improvements in Electric Motors for Talking-Machines, of which the following is a description.

The ordinary electric motor running upon direct current, possesses certain objections when used as a motor for driving the turntable of a talking machine. Among these objections may be cited:

First, the high speed at which such motors ordinarily run makes it necessary to introduce sets of reducing gears so that the speed of the turntable may be kept normally at about seventy eight revolutions per minute. The high speed motor is noisy and therefore extraordinary precaution must be taken to deaden the noise of the running parts; all these things tend to make the usual form of electric motor too expensive for driving a talking machine turntable.

Second, the usual high speed electric motor running on direct current is open to the objection of what is known in the art as the magnetic hum, which is invariably present and due to the shifting of the current alternately through the field magnets, or to the making and breaking of the circuit through such magnets.

Third, probably the most objectionable feature in the ordinary direct current motor is the sparking at the commutator brush, due to improper adjustment of the same. This ordinarily requires very careful attention in order to reduce such sparking to a minimum and when not completely obviated a snapping noise is invariably present. Not only does this noise make the motor itself objectionable, but the sparking rapidly deteriorates the commutator or circuit interrupter by burning and scarring.

Many other objections can be raised to the use of the ordinary direct current motor as a means for driving a talking machine turntable.

It is the object of my invention to overcome these several difficulties and to provide a slow speed motor of low current consumption to be driven by a low voltage battery current and one in which the sparking is completely obviated and the magnetic hum is no longer present.

I have also provided in my improved motor, means whereby accurate regulation of speed is obtained and such speed is maintained at a uniform rate, notwithstanding the variable friction drag upon the motor due to the engagement of the stylus needle with the record at different distances from its center.

I have shown a specific embodiment of my improvements in the accompanying drawings, wherein, Figure 1, is a vertical section on line 1—1 of Fig. 2.

Fig. 2, is a plan view of the motor detached from the motor board, and with the turntable removed.

Fig. 3, is a bottom plan view of the motor, showing the relative position of the parts and with the supporting cover and regulator removed.

Fig. 4, is an enlarged view showing the details of the collector brushes and current governor in their relative positions with respect to the circuit interrupter.

Figs. 5, 5$^a$, and 5$^b$, are detailed views of the circuit interrupter and its parts.

Fig. 6, illustrates the wiring diagram.

Figs. 7 and 8 are side and front views respectively of an element of the clutch mechanism. Fig. 9 is a section on line IX—IX of Fig. 4.

Similar reference numerals refer to like parts throughout the specification and drawings.

The essential parts of my motor are the stator and the rotor. The stator consists of the four field magnets, 1, supported upon a central bushing bearing 2, which is circular and cup-shaped, as clearly illustrated in Fig. 1. Its irregular shape is shown in Fig. 1, cross section. It has the cup-shaped upper flange 3, into which the magnet cores 4, are inserted and rigidly held in their radial positions. The lower end of the bearing 2, is flat and circular as shown at 5, and rests upon the boss 6, in the center of the cup-shaped frame or cover 7, against which it is rigidly held by the mechanism hereinafter described. In the bottom of the cup-shaped bearing is located the ball ring 8, which is L-shaped in cross section as clearly shown in Fig. 1. Passing through the central aperture in the bottom of the bearing 2, is the vertical shaft 9, screw-threaded at its bottom end and provided with the nut 10, upon its outer end by which said shaft is rigidly secured to the cover 7. It will be noted that the shaft 9, is provided with a shoulder 12, against which the bearing ring 8, rests, with the flange portion of said bearing resting in the bottom of the cup-shaped bushing 2. When the nut 10, is screwed home against the bottom of the cover 7, it will be seen that the bearing 2, and the magnets 1, are rigidly secured in position in the cover 7.

The rotor consists of the circular disk casting 13, provided with the plurality of armature projections 14, and the center bearing 15. The upper end of the shaft 9, is provided with the flange 16, beneath which is the ball bearing ring 17. The lower end of the center bearing 15, of the rotor is beveled or cone-shaped as at 18, so that it may bear upon the balls 19, as shown. The upper end of this center bearing bore of the rotor is enlarged and screw-threaded as at 20. In such enlarged portion is the adjustable cone bearing sleeve 21, to support the balls 22, which bear upon the ring bearing 17. The sleeve 21, may be screwed up or down so as to adjust the ball bearings both at the upper and lower end of the center bore of the rotor. When the bearings are properly adjusted by the sleeve bearing 21, the cover ring cap 23, may be inserted and the screws 24, screwed down so that said cover cap shall bear upon the upper end of the sleeve 21, and therefore prevent it from shifting.

It will be noted that the central shaft 9, is tubular and the upper portion of such shaft has a center bore considerably larger than the lower part thereof. In the upper enlarged bore of the shaft 9, is located the spindle 25, said spindle being provided with an integral collar 26, which rests upon the ball thrust bearing 27. This thrust bearing rests, in turn upon the upper end of the shaft 9. Rigidly secured to the spindle 25, is a disk cover 28, slightly less in diameter than the internal diameter of the cover 7. The central boss 29, and the set screw 30, serve to rigidly connect the spindle 25, and the cover disk 28. The turntable 31, is detachably secured to the spindle 25, in the usual or any preferred manner. At opposite sides of the disk 28, are the four downwardly projecting apertured bosses 32, with their apertures located in alinement with a tangent to the upper circumferential edge of the rotor 13. In each of these bosses is located the adjustable trunnions 33, and upon said trunnions are supported at diametrically opposite points the two heavy centrifugal governor weights 34. The location of the four trunnions 33, in the positions shown is for the purpose of locating the points of support for said weights 34, so that the centers of gravity of said weights shall be in alinement with the outer face of the rotor 13. The weights 34, are each provided with the pairs of upstanding projections 35, which have the alined apertures 36, therein to receive the pivot pins of the adjustable trunnions 33. At the middle point of the weights 34, is another upstanding projection 37, extending upwardly through apertures 38, in the disk 28, as shown in Fig. 1. These upstanding projections 37, have horizontal apertures therethrough into which are inserted the two brake elements 39, in position to bear upon the outer circumference of the rotor 13. Projecting horizontally from the two projections 37, are the arms 40, extending toward the center of the rotor. These arms are rigidly held in place by means of the set screws 41, which also serve the purpose of securing the brake elements 39, in their correct and adjusted positions. Located on the spindle 25, beneath the disk 28, is the flat spring 42, the ends of which extend outwardly and beneath the two arms 40. When the spring 42, is pressed upwardly from its center, its outer ends will have a tendency to raise the two arms 40, or otherwise to oscillate the weights 34, upon their trunnions and cause the brake elements 39, to grip the circumference of the rotor 13, so that if the rotor is revolved upon its center bearing the tendency under the circumstances, as described, will be for the said rotor to carry with it two centrifugal weights 34, and since said weights have a tendency under their own action to swing outwardly about their trunnions 33, whenever such centrifugal action is sufficient it will result in carrying the brake elements 39, free from the circumference of the rotor, so that the disk 28, and the supported centrifugal weights 34, will revolve independently of the rotor 13. When however, the tension of the spring 42, is sufficient to overcome the centrifugal action of the two weights 34, the brake elements 39, will continue to grip the circumference of the rotor 13, and the two will rotate together.

The spindle 25, it will be noted, is provided in its lower end with a cylindrical cavity which extends upwardly to the point above the collar 26, at which point there is a horizontal cross slot 43, in which is located a cross gib or key 44, which extends outwardly and bears upon the under side of the spring 42. Extending upwardly into the cylindrical cavity is a cylindrical pin 45. This cavity is in alinement with the central bore 46, of the shaft 9, and within such bore 46, is a pin 47, which, when in position engages the lower end of the pin 45. The cover is provided upon one side with a downward projection 48, to which the regulating lever 49, is pivoted as shown. One end of said lever extends upward following somewhat the contour of the bottom of the cover 7, with its outward end extended horizontal as at 50. The cover 7, is provided with a lateral projection 51, through which the thumb screw 52, extends and bears upon the horizontal part 50. By screwing this thumb screw 52, up or down the pins 45, and 47, are elevated or lowered so as to vary the tension of the spring 42, and consequently regulate the action of the centrifugal governor weights 34.

The lower end of the central bearing 2, is cylindrical and upon this cylindrical part is mounted the circuit interrupter 53, the details of which will be hereinafter more fully set forth.

The rotor, as above described, is provided with a plurality of armature projections 14, which, when the rotor is in motion, swing with their inner faces in immediate proximity to the poles of the field magnets 1. Each of these armature projections is provided with a lateral offset 54, for the purpose hereinafter to be described. Secured to a pair of these armature projections is a flat supporting plate 56, having the peculiar contour clearly illustrated in Fig. 3. This plate has a cut out portion as at 57, with a portion of the plate as 58, bent outwardly at right-angles to the plane of said plate and sheared away from the body thereof, and such sheared away portion bent at right-angles as at 59, to the part 58, thereby forming a bracket to which the long flat spring 60, is riveted, such spring extending horizontally, and having secured at its outer end a weight 61. At 62, is a pivot pin rigidly secured to the plate 56, and projecting at right-angles from the face thereof. Upon such pivot pin 62, are mounted the two brush holders 63, and 64, such brush holders carrying at their outer ends the brushes 65, and 66, in position to bear upon the circuit interrupter 53. Connecting the two brush holders 63, and 64, is a coil spring 67, the tendency of which is to firmly hold the two brushes 65, and 66, against the face of the circuit interrupter 53. The bent end of the brush holder 63, is provided with a clutch member 68, the inner face of which is curved upon the arc of the circle with the pivot pin 62, for its center. Mounted upon the pivot pin 62, is an arm 69, having pivotally secured at its lower end the clutch member 70, in position to engage the clutch member 68. At 71, is a projection integral with the plate 56, and projecting at right-angles to the plane thereof, for the purpose of carrying the adjusting stop screw 72, the upper end of which is in position to bear upon the arm 73, which latter is integral with the arm 69. By adjusting the stop screw 72, the movement of the arm 69, may be limited. Surrounding the pivot pin 62, is the coil spring 74, one arm of which bears upon the face of the arm 69, and the other arm bears upon the projection 71. The tendency of said spring 74, is to hold the arm 69, in the position as shown, with arm 73, bearing against the adjusting stop screw 72. The upper end of the clutch member 70, is connected to the spring 60, by the toggle 75. The spring 76, is located between the face of the spring 60, and the shoulder 77, of the toggle 75, while the adjusting nut 78, is provided upon the outer end of the toggle 75, so as to adjust the tension of the spring 60, relative to the tension of the spring 74.

It will be noted now that if the weight 61, flies outward away from the center of the motor it will carry with it the toggle 75, and thereby move the clutch member 70, into engagement with the clutch member 68, and, if the centrifugal force acting upon the weight 61, is strong enough it will result in causing the engagement of the clutch members 68, and 70, whence further outward movement of the weight 61, will carry with it the brush holder 63, and brush 65, so as to separate said brush from the circuit interrupter 53. The action of the weight 61, in doing this must overcome the tension of the spring 60, and the tension of the spring 67 as well as that of the spring 74. When, however, the centrifugal action of the weight 61, is insufficient to overcome the tension of the spring 60, the stop screw 72, and the nut 78, are so adjusted that the clutch member 70, will be released from the clutch member 68. As the brush 65, wears down from this constant contact with the interrupter 53, the spring 67, will always insure engagement between such brush 65, and the interrupter 53, so that the tension of the spring 60, will not affect such engagement. This, however, would not be the case if the weight 61, were connected directly to the brush holder 63, for no matter how much the brush 65, may wear down with a consequent change in position of the brush holder 63, relative to the clutch member 70, whenever the centrifugal action of the weight 61, is sufficient to cause engagement of the two clutch members 68, and 70, no matter what the position of the brush holder 63, may be in be in consequence of the wearing away of the brush 75, an immediate separation of said brush 65, from the interrupter 53, will take place.

The brush holder 64, which carries the brush 66, is insulated from direct contact with said brush by the insulating washer 79. The brush 66, is of a peculiar composition and has at its upper end what is known as a carbon resistance 80, such carbon resistance being connected to the holder 64, by means of the connecting wire 81. Current, therefore, passing through the brush holder 64, must be by way of the connecting wire 81, through the resistance 80, to the brush 66. If desired I may substitute for the carbon resistance 80, a resistance wire, the object in any case being to interpose a resistance somewhere between the brush 66, and the brush holder 64, the purpose of which to be hereinafter described. The brush 66, may be of a high resistance material, in which case, the insulation 79, may be omitted.

It will be noted that both the brush holders 63, and 64, are mounted directly upon and are therefore in metallic contact with the rotor 13, through the medium of the plate 56.

The circuit interrupter 53, consists of two rings exactly alike and each formed from a disk of metal and provided with a plurality of projecting teeth 83, which are bent at right-angles to the plane of the disk. There are as many teeth in each of these elements as there are armature projections 14, upon the rotor. In assembling the interrupter, the two elements thereof are brought together with their teeth intermeshing and insulated from each other. In uniting them, they are held in a frame with their teeth intermeshing as above described and then some plastic insulating material, as for example, Bakelite, is molded into the spaces between the teeth all around the flat disk portions thereof and then allowed to harden leaving only the exterior face or surface of the teeth exposed. The resulting structure is a cylindrical ring of the insulating material in which is embedded the two elements of the interrupter with only the outer faces of the teeth of said two elements exposed. Thus constructed, it will be noted that the teeth of one element alternate with the teeth of the other element. When completed this cylindrical ring is forced upon the cylindrical part of the central bushing 2, as clearly shown in Fig. 1. The diametrically opposite magnets are coupled together in pairs, one pair of said magnets being connected to one of said interrupter elements, and the other pair of magnets is connected to the other element of said interrupter as clearly shown in the diagrammatic view, Fig. 6.

It will be noted from Fig. 3, that the two pairs of field magnets are not at exactly right-angles to each other, but that when the poles of one pair of magnets are immediately adjacent to a pair of the armature poles 14, the poles of the other pair of magnets are located between the corresponding pairs of armature poles 14. The reason for this will appear later. The armature poles 14, are provided with the lateral projections 54, so that when in the position indicated in Fig. 3, when said magnets are energized there will be an armature pole always within the field of said magnet. Inasmuch as the circuit is broken alternately from the pairs of magnets and such break takes place at the instant when one pair of magnets has its poles immediately adjacent to a pair of armature poles and at the same instant the other pair of magnets is energized, it will be seen that there is only a small air gap between the projections 54, and the poles of the magnets upon the advancing set, while there is a considerable air gap between said poles of the magnets and the receding armature poles.

When mounted upon the board A, as shown in Fig. 1, the cover 7, is secured to the under face of the motor board by means of the screws 90, which extend down from the upper side of the motor board through the felt washers 91, and are screwed into the screw-threaded apertures 92, in the flange 93, of the cover 7. The central boss 29, and spindle 25, extend up through the aperture 94, in the motor board.

In the wiring diagram as illustrated in Fig. 6, I have shown only eight armature poles and sixteen segments in the interrupter. This is done for the purpose of simplifying the description and illustration. It is to be understood, however, that I do not limit myself to the number of armature poles in the rotor, but whatever that number may be, there will be a corresponding number of teeth in the circuit interrupter elements 53. In practice the source of current is a set of dry battery cells, and in order to conserve current, I arrange such cells in two groups as B and C, arranged with their negative terminals connected to one leading out wire D, grounded upon any metallic member of the motor, as for example, upon the cover 7. Other leading out wires $b$ and $c$, are connected to the field magnet coils, passing through such coils in series and thence leading respectively to the interrupter elements. The brushes 65, and 66, are both grounded upon the rotor and since the rotor and the bearing 2, are in metallic contact the circuit will be complete.

From the foregoing description of the details of my improved motor taken in connection with the diagrammatic view in Fig. 6, a full understanding of the operation of the motor may be readily gathered. In the position of the parts illustrated in Fig. 6, the brush 65, is shown completely upon a segment or tooth of the circuit interrupter 53, which is in electrical connection through circuit $b$, with battery B; in other words the circuit is closed through circuit $b$. This includes the two magnets which are shown with their poles mid-way between two pairs of the armature pole pieces 14. The magnet cores 4, being now magnetized will attract pole pieces 14, and thus cause rotation of the rotor 13. The brush 65, will advance to the next segment of the interrupter 53, at the moment when the two cores of the magnets just energized are directly opposite a pair of the armature poles 14. At this instant the brush 65, will have left the interrupter segment connected with circuit $b$, and consequently the magnets which are in that circuit will be deënergized.

From this it will be seen that the two sets of magnets are alternately energized by the two batteries B and C, by what is known as the making and breaking method; when one battery is in a closed circuit the other battery is in the open circuit and vice versa. In order to prevent sparking at the brush 65, I introduce the additional brush 66, and connect the same through the resistance 80, to the rotor in the same manner that the brush 65, is connected to said rotor; that is, through the means of the brush holders 63, and 64, by way of the pin 62, and plate 56, as shown in Figs. 3, and 4. The position, however, of the brush 66, is such that when the brush 65, is just leaving one segment, the brush 66, overlaps slightly a segment of the other element of the circuit interrupter. This overlapping is clearly shown in Fig. 6, and results in permitting the current for example, to continue through circuit c, by way of the brush 66, and its resistance 80, after the brush 65, has left the corresponding segment of the interrupter element which is in electrical connection with circuit c. Thus instead of breaking the circuit through the interrupter segment suddenly, as the brush 65, advances, when the break occurs there is still a path of high resistance for the current, thereby preventing the sparking at the brush 65; and since the current passing through the brush 66, is reduced very materially by the high resistance 80, the sparking is reduced to a minimum in theory, while in practice it is absent entirely, and the magnetic hum is obviated.

I regard this feature of my invention as of the highest importance in a motor of the character described, and it is also an important improvement in motors generally, and for that reason I desire to claim this means for overcoming the sparking at the collector brush broadly.

It has been common and well known in the electrical art to construct motors of the make and break type broadly as illustrated in the drawings and described in this specification. However, I believe it radically new to provide separate pairs of field magnets and to energize such pairs of magnets alternately or in sequence from separate sources of electrical energy. It is well known that the commercial dry battery cell is of comparatively short life when used in a closed circuit, and yet such cells operate admirably upon an open circuit which is closed only at intervals. During the open intervals the battery cell will recuperate, so that if such cell is in a so called open circuit the aggregate of the closed intervals will be much greater than what would represent the life of the battery if it were in a continuous closed circuit.

By the arrangement of the pair of batteries in the two open circuits utilizing their current alternately, I am enabled to accomplish two things. First and most important, the lengthening of the life of the batteries; and second, the reduction in the voltage utilized. In practice I am able to use as small a battery set as three dry cells for each battery. Whereas to accomplish the same results by connecting up all of the four field magnets in series and use a single battery set the entire voltage of six cells would be necessary, with a corresponding rapid deterioration of the battery. This is due to the fact that there are just twice the number of magnetic impulses, divided between the two sets of magnets, and these impulses are alternately applied through the two sets of magnets. Since there are twice the number of impulses per revolution, it follows that each impulse may be half the intensity that would be required if the pairs of magnets were arranged in series and at right angles, instead of at less than a right angle apart.

While I have shown the pairs of magnets at less than a right-angle apart, this is done because the number of poles in the armature happen to be an exact multiple of the number of magnets and the angular shift of the pair of said magnets is for the sole purpose of locating such pair of magnets with their cores 4, mid-way between a pair of armature poles 14, at the instant that the other cores are immediately adjacent to a pair of said armature poles as illustrated in Figs. 3, and 6. The same result however, may be accomplished by arranging the magnets in pairs at right-angles to each other and selecting a number of armature poles in accordance with the formula $4n$ plus 2, where $n$ may be any number, for example: let $n$ equal 3, then the number of poles in the armature would be 4 x 3 plus 2, or 14. Again, let $n$ be 5, then the formula would reduce to 22, so that no matter how many poles the armature may have so long as they bear this relation to the number of magnets, one pair of such magnets will have its cores half way between a pair of armature poles, at the same time the other pair of magnet cores are immediately adjacent to a corresponding pair of armature poles.

I have not deemed it necessary to illustrate this point since it will be readily understood from the drawings.

With the parts arranged in the manner illustrated in the drawings and the two circuits closed as indicated in Fig. 6, the rotor 13, will continue to rotate and carry with it the turntable 31, at a speed of about 80 revolutions a minute, when each of the batteries B, and C, is composed of three cells of about one and one half volts each. The tension of the regulating spring 42, may be so regulated by means of the thumb screw 52, and the parts thereof described in connection therewith, that, at a speed of 80 revolutions per minute for the rotor, the governor weights 34, will hang at what may be termed the critical point; that is to say, the point at which an increase in the rate of rotation will cause the weights 34, to swing outward just sufficient to release the brake elements 39, from the circumference of the rotor. From that point forward the rotor will continue to rotate with its own speed, but the cover disk 28, and the weights 34, will rotate with their own momentum. Any slight slackening of the speed of the cover disk 28, will cause the weights 34, to swing backward under the influence of the spring 42, when of course the brake elements 39, will grip the circumference of the rotor. By raising the center of the spring 42, through the medium of the thumb screw 52, and the lever 49, the critical point may be retarded, that is to say, a higher rotational rate may be acquired by the cover plate 28, and the spindle 25, before the weights 34, swing outwardly to a sufficient distance and carry the brake elements 39, free from the circumference of the rotor. Correspondingly a reduction of the tension of the flat spring 28, will advance the critical point and cause the weights 34, to swing outwardly at a lower rotational rate.

The provision of the lateral offsets 54, upon the pole pieces 14, facilitates the self-starting of the motor, no matter where such pole pieces stand when the motor is stopped. The interrupter 53, is so adjusted that the circuit through one pair of magnets is broken at the instant that the cores are adjacent to a pair of the poles 14. Simultaneously the circuit is closed through the other pair of magnets. If it should happen that when the motor is stopped, the poles should stand in the positions just described, relative to the magnet cores, the closing of the circuit in the attempt to start the motor would result in balanced attraction of the magnet cores 4, upon the two pole pieces 14, standing on either side of said cores with the possible result that the motor would not start. Out of more than a hundred trials it is possible that the motor would fail to start once. By means of the lateral offsets 54, this balanced attraction is overcome therein. They serve to break this attraction and facilitate the starting of the motor under the condition just described.

In tests made to determine the battery consumption of the motor made in accordance with the foregoing description, I have been able to reproduce more than two thousand of the ordinary commercial disk records before the batteries B, and C, were exhausted. In practice the parts are constructed and adjusted so as to give the rotor a rotational rate of about 90 revolutions per minute, when working upon the maximum of current supplied by two sets of batteries B, and C. This is accomplished by the adjustment of the brush governor weight 61, through the medium of the adjusting nut 78. Further adjustment to give any desired speed for the turntable 31, is accomplished by means of the thumb screw 52, and adjustment of the tension of the spring 42, thereby.

From the foregoing description taken in connection with the drawing it will be seen that I have accomplished the results sought, by means at once simple and easy of manipulation. The rotation of the turntable 31, under the influence of the two governors described is absolutely uniform, even under the varying drag due to the different radial positions of the stylus needle upon the face of the record being reproduced.

I claim:

1. In an electric motor, the combination of a stator provided with a plurality of radially supported field magnets, a rotor therefor having a plurality of pole pieces arranged to rotate in immediate proximity to the poles of said magnets, means for alternately energizing and deënergizing said magnets to produce rotation of said rotor, a spindle concentric to but independent of said rotor, and means for connecting said spindle to said rotor, comprising a pair of centrifugal weights connected to said spindle and having means for frictional engagement with the circumference of said rotor, whereby at a predetermined rotational rate said spindle and rotor will rotate independently of each other.

2. In an electric motor, the combination of a stator provided with a plurality of radially supported field magnets, a rotor therefor having a plurality of pole pieces arranged to rotate in immediate proximity to the poles of said magnets, means for alternately energizing and deënergizing said magnets to produce rotation of said rotor, a spindle concentric to but independent of said rotor, means for connecting said spindle to said rotor comprising a pair of centrifugal weights connected to said spindle and having means for frictional engagement with the circumference of said rotor, and means for varying the degree of such frictional engagement, whereby at any predetermined rotational rate said spindle and rotor will rotate independently of each other.

3. In an electric motor, for talking machines, the combination of a stator comprising a plurality of pairs of field magnets radially disposed from a common center, a rotor having a plurality of armature poles arranged to rotate in immediate proximity to the cores of said field magnets, each pair of said field magnets, adapted to be energized from a separate source of electrical energy, a sectional circuit interrupter having the sections thereof in circuit respectively with each of said pairs of field magnets, a brush bearing upon said circuit interrupter and having a common connection with said sources of electrical energy, whereby the electrical circuit is alternately closed through said separate pairs of field magnets.

4. In an electric motor, the combination of a stationary, sectional circuit interrupter, means for connecting each section thereof with a separate source of electrical energy, a main brush mounted to rotate in contact with said interrupter and located in the common return from said sources of electrical energy, and a supplemental brush connected up in parallel with said main brush through a high resistance, said supplemental brush being in lagging contact with said interrupter with respect to said main brush.

5. In an electric motor, the combination of a segmental circuit interrupter, a main brush bearing upon said interrupter and adapted to be connected in circuit with a source of electrical energy, a supplemental brush having high resistance connected in parallel with said main brush but in lagging contact with said interrupter with respect to said main brush, and centrifugal means connected to said main brush for lifting it free from said interrupter at a predetermined rate of rotation of said brush about said interrupter.

6. In an electric motor, the combination of a stationary, sectional circuit interrupter, each section thereof being adapted to be connected in circuit with a separate source of electric energy, a main brush connected up in the common return from said sources of electrical energy and mounted to rotate about said interrupter and in contact therewith, a supplemental brush, connected up in parallel with said main brush through a high resistance, said supplemental brush being in lagging contact with said interrupter, with respect to said main brush, and centrifugal means for lifting said main brush from said interrupter, at a predetermined rate of rotation of said brush.

7. In an electric motor, the combination of a segmental circuit interrupter, and a main brush, means for rotating one of said parts in contact with the other, a source of electrical energy in circuit with said interrupter and brush, a supplemental brush having a high resistance in said circuit, in lagging contact with said interrupter with respect to said main brush, and centrifugal means for lifting said main brush from said interrupter at a predetermined rate of rotation of said rotating part without affecting the contact of said supplemental brush with said interrupter.

8. In an electric motor, the combination of a rotor and a stator, said stator comprising a plurality of pairs of field magnets, a sectional circuit interrupter, having each section thereof in circuit with a pair of said field magnets, each pair of said magnets adapted for connection with a separate source of electrical energy, and a brush carried by said rotor in contact with said interrupter, said brush being in the common return circuit to said sources of electrical energy.

9. In an electric motor, the combination of a rotor and a stator, said stator comprising two pairs of field magnets, each pair being diametrically opposite, and both pairs radially arranged from a common center, an annular sectional circuit interrupter having its alternate sections connected respectively to said pairs of magnets, a brush carried by said rotor in contact with said interrupter, and two separate sources of electrical energy, each source connected in circuit with a pair of said magnets the corresponding section of said interrupter and said brush.

10. In an electric motor, the combination of a rotor and a stator, said stator comprising a plurality of pairs of field magnets, a sectional circuit interrupter, having each section thereof in circuit with a pair of said field magnets, a separate source of electric energy for each pair of said magnets, a brush carried by said rotor in contact with said interrupter, said brush being in the common return circuit to said sources of electrical energy, and centrifugal means carried by said rotor for lifting said brush from said interrupter at a predetermined rate of rotation thereof.

11. In an electric motor, the combination of a rotor and a stator, said stator comprising two pairs of field magnets, each pair being diametrically opposite, and both pairs radially arranged from a common center, an annular sectional circuit interrupter having its alternate sections connected respectively to said pairs of magnets, a brush carried by said rotor in contact with said interrupter, two separate sources of electrical energy, each source connected in circuit with a pair of said magnets the corresponding section of said interrupter and said brush, and centrifugal means carried by said rotor for lifting said brush from said interrupter at a predetermined rate of rotation thereof.

12. In an electric motor for talking machines, the combination of a rotor and a stator, said stator comprising two pairs of field magnets, a circuit interrupter having two toothed sections, arranged with their teeth intermeshing and insulated from each other, to form a common cylindrical surface, a brush carried by said rotor and bearing upon the cylindrical surface of said interrupter, and a separate source of electrical energy in circuit respectively with each pair of said magnets, the corresponding section of said interrupter, and said brush.

13. In an electric motor, for talking machines, the combination of a rotor and a stator, said stator comprising two pairs of field magnets, a circuit interrupter having two toothed sections, arranged with their teeth intermeshing and insulated from each other, to form a common cylindrical surface, a brush carried by said rotor and bearing upon the cylindrical surface of said interrupter, a separate source of electrical energy in circuit respectively with each pair of said magnets, the corresponding section of said interrupter, and said brush, and centrifugal means carried by said rotor, for lifting said brush from said interrupter at a predetermined rate of rotation of said rotor.

JAMES T. SIBLEY.